(12) United States Patent
Kim et al.

(10) Patent No.: US 11,541,886 B2
(45) Date of Patent: Jan. 3, 2023

(54) VEHICLE TRAVELING CONTROL APPARATUS, METHOD AND SYSTEM

(71) Applicants: HYUNDAI MOTOR COMPANY, Seoul (KR); KIA MOTORS CORPORATION, Seoul (KR)

(72) Inventors: Ryuk Kim, Seoul (KR); Byoung Joon Lee, Suwon-si (KR); Jong Chul Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 68 days.

(21) Appl. No.: 16/994,870

(22) Filed: Aug. 17, 2020

(65) Prior Publication Data
US 2021/0053565 A1 Feb. 25, 2021

(30) Foreign Application Priority Data
Aug. 23, 2019 (KR) .................. 10-2019-0104019

(51) Int. Cl.
*B60W 30/12* (2020.01)
*B60W 40/08* (2012.01)
(Continued)

(52) U.S. Cl.
CPC .............. *B60W 30/12* (2013.01); *B60Q 1/46* (2013.01); *B60W 30/18163* (2013.01); *B60W 40/08* (2013.01); *G06V 20/597* (2022.01); *B60W 2540/221* (2020.02); *B60W 2540/225* (2020.02); *B60W 2540/229* (2020.02)

(58) Field of Classification Search
CPC ..... B60K 28/06; B60Q 1/46; B60W 2420/42; B60W 2756/10; B60W 30/12; B60W 30/18; B60W 40/08; B60Y 2302/05; G05D 1/0022; G05D 1/0088; G05D 2201/0213; G06K 2009/00939; G06K 9/00281; G06K 9/00845; G06K 9/00892
See application file for complete search history.

(56) References Cited

U.S. PATENT DOCUMENTS

2008/0126281 A1* 5/2008 Kisacanin .............. G08B 21/06
706/20
2014/0207535 A1* 7/2014 Stefan .................... G07C 5/008
705/7.42
(Continued)

FOREIGN PATENT DOCUMENTS

KR 20150061668 A * 6/2015
KR 10-2016-0078020 A 7/2016
(Continued)

*Primary Examiner* — Peter D Nolan
*Assistant Examiner* — Ce Li Li
(74) *Attorney, Agent, or Firm* — Morgan, Lewis & Bockius LLP

(57) ABSTRACT

A vehicle includes: a plurality of sensor devices that determine a driver state; a driver state determining device that receives detection results from a plurality of sensor devices and determines whether the driver state is a dangerous state; and a driving assistance device that performs lane keeping control and speed control of a vehicle and transmits a network connection request to a management server when the driver state determining device has determined the dangerous state.

19 Claims, 14 Drawing Sheets

(51) Int. Cl.
  *B60W 50/08* (2020.01)
  *B60Q 1/46* (2006.01)
  *B60Q 1/52* (2006.01)
  *B60W 10/20* (2006.01)
  *B60W 30/18* (2012.01)
  *B60W 40/105* (2012.01)
  *G06V 20/59* (2022.01)

(56) References Cited

U.S. PATENT DOCUMENTS

2018/0192779 A1* 7/2018 Yan .................... H04N 21/4131
2020/0265251 A1* 8/2020 Vandommele ....... A61B 5/1128

FOREIGN PATENT DOCUMENTS

KR  10-2018-0048097 A  5/2018
KR  10-2019-0011545 A  2/2019

* cited by examiner

|  | AGES | | | | | |
|---|---|---|---|---|---|---|
|  | 18–25 | 26–35 | 36–45 | 46–55 | 56–65 | 65+ |
|  | 49–55 | 49–54 | 50–56 | 50–57 | 51–56 | 50–55 |
| EXCELLENT | 56–61 | 55–61 | 57–62 | 58–63 | 57–61 | 56–61 |
| GOOD | 62–65 | 62–65 | 63–66 | 64–67 | 62–67 | 62–65 |
| ABOVE AVERAGE | 66–69 | 66–70 | 67–70 | 68–71 | 68–71 | 66–69 |
| AVERAGE | 70–73 | 71–74 | 71–75 | 72–76 | 72–75 | 70–73 |
| BELOW AVERAGE | 74–81 | 75–81 | 76–82 | 77–83 | 76–81 | 74–79 |
| POOR | 82+ | 82+ | 83+ | 84+ | 82+ | 80+ |

FIG. 4A

| FEMALE | AGES | | | | | |
|---|---|---|---|---|---|---|
| | 18-25 | 26-35 | 36-45 | 46-55 | 56-65 | 65+ |
| ATHLETE | 54-60 | 54-59 | 54-59 | 54-60 | 54-59 | 54-59 |
| EXCELLENT | 61-65 | 60-64 | 60-64 | 61-65 | 60-64 | 60-64 |
| GOOD | 66-69 | 65-68 | 65-69 | 66-69 | 65-68 | 65-68 |
| ABOVE AVERAGE | 70-73 | 69-72 | 70-73 | 70-73 | 69-73 | 69-72 |
| AVERAGE | 74-78 | 73-76 | 74-78 | 74-77 | 74-77 | 73-76 |
| BELOW AVERAGE | 79-84 | 77-82 | 79-84 | 78-83 | 78-83 | 77-84 |
| POOR | 85+ | 83+ | 85+ | 84+ | 84+ | 85+ |

FIG. 4B

VEHICLE TRAVELING CONTROL APPARATUS, METHOD AND SYSTEM

CROSS-REFERENCE TO RELATED APPLICATION

This application claims the benefit of priority to Korean Patent Application No. 10-2019-0104019, filed in the Korean Intellectual Property Office on Aug. 23, 2019, the entire contents of which are incorporated herein by reference.

TECHNICAL FIELD

The present disclosure relates to a vehicle traveling control apparatus, a vehicle traveling control method and a vehicle traveling control system.

BACKGROUND

Recently, vehicles are equipped with driving assistance functions for driving assistance and safety assurance.

A lane change function can prevent a vehicle from changing a lane when a dangerous situation occurs. For example, a vehicle may not able to change a lane in a situation such as detecting a dangerous situation of a vehicle, detecting hands-off, turning off a signal indicator light by a driver, delaying a lane change operation, a driver steering override, lane non-detection/mis-detection, or the like.

However, when a lane change function is interrupted when a dangerous situation such as drowsiness or abnormality in a biometric signal occurs in the driver during driving assistance, the driver may not immediately be able to cope with the dangerous situation.

SUMMARY

The present disclosure has been made to solve the above-mentioned problems occurring in the prior art while advantages achieved by the prior art are maintained intact.

An aspect of the present disclosure provides a vehicle traveling control apparatus, method and system which detect a driver's problem situation such as drowsiness, abnormality in a biometric signal or the like in a state where the lane change function is stopped while the vehicle is traveling, and transmit the vehicle internal/external situation information to a management server when the dangerous situation is determined, allow the vehicle to be gradually moved to an end lane of a driving road and stop through wireless control when the management server determines that the dangerous situation is determined based on the information, thereby promptly dealing with the driver's dangerous situation.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle includes: a plurality of sensor devices that determine a driver state; a driver state determining device that receives detection results from a plurality of sensor devices and determines whether the driver state is a dangerous state; and a driving assistance device that performs lane keeping control and speed control of a vehicle and transmits a network connection request to a management server when the driver state determining device has determined the dangerous state.

According to another aspect of the present disclosure, a vehicle traveling control system includes: a vehicle that transmits a network connection request when a driver state is a dangerous state; and a management server that connects the vehicle to a network and wirelessly controls traveling of the vehicle when the network connection request is received from the vehicle.

According to another aspect of the present disclosure, a vehicle traveling control method includes: a driver state information collecting step of detecting at least one or more of a driver image, a traveling state of a vehicle, or biometric information of a driver; a first dangerous state determining step of determining a dangerous state based on the at least one or more of the driver image, the traveling state of the vehicle, or the biometric information of the driver which are detected; a vehicle and driver state information transmitting step of transmitting a detection result of the driver state information collecting step to a management server when the dangerous state is determined in first dangerous state determining step; a second dangerous state determining step of determining the dangerous state based on the detection result transmitted in the vehicle and driver state information transmitting step; a driving assistance command transmitting step of transmitting a driving assistance command to the vehicle when the dangerous state is determined in the second dangerous state determining step; and a driving assistance function auxiliary control step of controlling the traveling of the vehicle according to wireless control of the management server when the driving assistance command is received.

BRIEF DESCRIPTION OF THE DRAWINGS

The above and other objects, features and advantages of the present disclosure will be more apparent from the following detailed description taken in conjunction with the accompanying drawings:

FIGS. 4A, 4B, and 4C are diagrams for describing determination of physical risk in the driver state determining device of FIG. 2;

DETAILED DESCRIPTION

Figure 1:
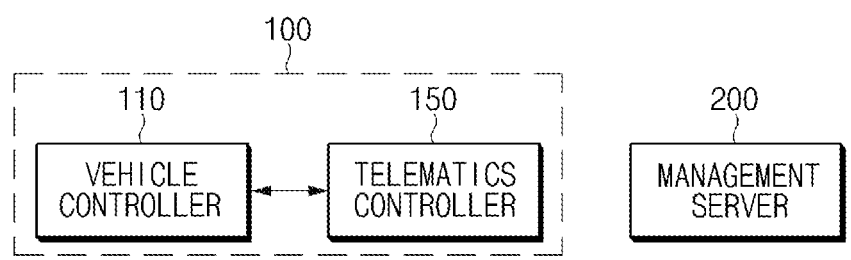
FIG. 1 is a diagram illustrating a configuration of a vehicle traveling control system according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings.

Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a diagram illustrating a configuration of a vehicle traveling control system according to an embodiment of the present disclosure.

Referring to FIG. 1, a vehicle traveling control system according to an embodiment of the present disclosure may include a vehicle 100 including a vehicle controller 110 and a telematics controller 150 and a management server 200. In this case, the vehicle controller 110 and the telematics controller 150 provided in the vehicle 100 of the vehicle traveling control system according to an embodiment of the present disclosure may be implemented within the vehicle. The vehicle controller 110 and the telematics controller 150 may be integrally formed with internal control units of the vehicle, and may be implemented as separate devices and connected to the control units of the vehicle through separate connection means. The vehicle controller 110 may operate in conjunction with an engine and a motor of the vehicle, and may operate in conjunction with a control unit that controls the operation of the engine or the motor.

The vehicle controller 110 may be connected to the telematics controller 150 by in-vehicle local area wired communication such as a controller area network (CAN) and an Ethernet.

The telematics controller 150 may be connected to the management server 200 by wireless communication. In this case, the telematics controller 150 and the management server 200 may transmit and receive information encrypted by an encryption module.

The vehicle controller 110 may communicate with the management server 200 using the telematics controller 150 as a repeater.

The vehicle controller 110 may determine a driver state and transmit a result of the determination to the management server 200 through the telematics controller 150.

The management server 200 may control the vehicle controller 110 through the telematics controller 150 when the driver's risk is detected. For example, the management server 200 may control the vehicle controller 110 according to a result of the determination of the driver state which is provided from the vehicle controller 110. In addition, when the result of the determination of the driver state which is provided from the vehicle controller 110 tells that a dangerous situation occurs, the management server 200 may again identify the driver state and the dangerous situation based on internal and external camera information of the vehicle, and then control the vehicle controller 110.

The management server 200 may control the vehicle controller 110 by transmitting a vehicle movement command when the driver or the vehicle is under the dangerous situation. For example, the management server 200 may check the vehicle surrounding information transmitted from the camera of the vehicle when a driver state or a vehicle state is in the dangerous situation, and wirelessly control the vehicle 100 to turn on the emergency light, move to the end land, and stop.

Figure 2:
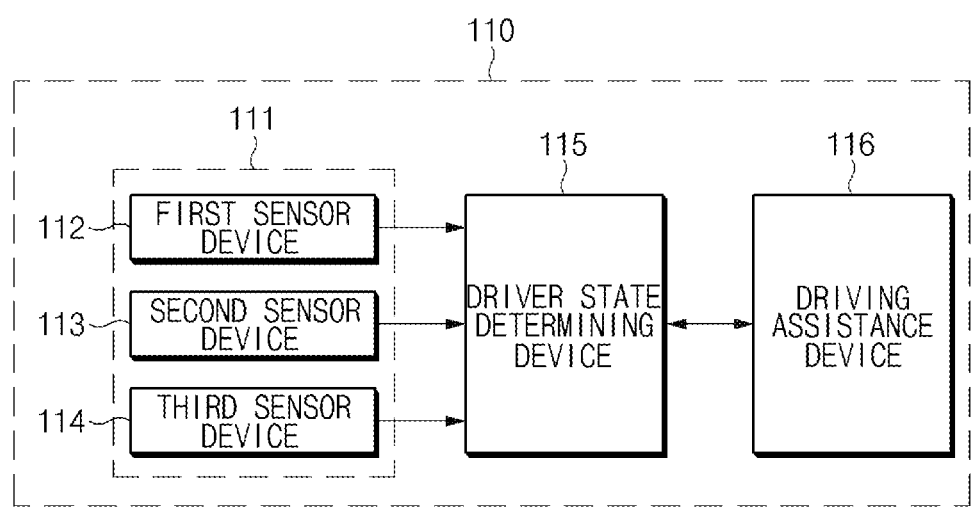
FIG. 2 is a diagram illustrating a configuration of the vehicle controller illustrated in FIG. 1 according to an embodiment.

FIG. 2 is a diagram illustrating a configuration of the vehicle controller illustrated in FIG. 1 according to an embodiment.

Referring to FIG. 2, the vehicle controller 110 may include a sensor group 111 including at least one sensor device, a driver state determining device 115, and a driving assistance device 116.

The sensor group 111 may include a plurality of sensor devices 112, 113, and 114, and detect a driver image, driver biometric information, and a traveling state of the vehicle 100, which are used to determine a driver state and a movement of the vehicle 100. Although the first to third sensor devices 112, 113, and 114 are included in the sensor group 111 as the embodiment of the vehicle controller 110 in FIG. 2, but embodiments are not limited thereto.

A first sensor device 112 may include an image sensor capable of capturing a driver image. For example, the first sensor device 112 may include a camera capable of capturing a driver image.

A second sensor device 113 may include sensors capable of detecting a traveling state of the vehicle 100. For example, the second sensor device 113 may include a speed sensor, an acceleration sensor, a yaw rate sensor, a front camera for photographing lanes, and the like.

A third sensor device 114 may include sensors for measuring a driver state, such as a heart rate, a blood pressure, and a body temperature of the driver.

The driver state determining device 115 may determine drowsy driving, negligence driving, and an abnormal physical state of the driver when the driver drives a vehicle without looking ahead. For example, the driver state determining device 115 may determine the drowsy driving, the negligence driving, and the abnormal physical state of the driver based on the outputs of the first to third sensor devices 112, 113, and 114.

The driving assistance device 116 may operate a turn signal when the drowsy driving, the negligence driving, or the abnormal physical state of the driver is determined, be wirelessly connected to the management server 200, and perform lane maintenance control and deceleration of the vehicle. In addition, the driving assistance device 116 may transmit the internal and external screens of the vehicle, that is, vehicle traveling images and driver images, to the management server 200 and ignore the acceleration input of an accelerator pedal. In addition, when determining that the driver state is serious by determining images transmitted by the driving assistance device 116, the management server 200 may transmit a vehicle movement command to the driving assistance device 116. The driving assistance device 116 which has received the vehicle movement command may forcibly move the vehicle 100 to the end lane of the driving road and stop the vehicle 100 under the control of the management server 200. The driving assistance device 116 may include a global positioning system (GPS) receiver.

The operation of the vehicle traveling control apparatus according to the embodiments illustrated in FIGS. 1 and 2 is described as follows.

The driver state determining device 115 may determine the drowsy driving, negligence driving, or abnormal physical state of the driver based on the outputs of the first to third sensor devices 112, 113, and 114, and operate the driving assistance device 116 when a dangerous situation is determined.

For example, the first sensor device 112 may provide a driver image to the driver state determining device 115. The second sensor device 113 may provide the driver state determining device 115 with information such as a traveling state of the vehicle 100, that is, whether the vehicle is out of lane, or the speed, acceleration, or steering angle of the vehicle. In addition, the third sensor device 114 may provide the driver state determining device 115 with information such as the heart rate, blood pressure, or body temperature of the driver. The driver state determining device 115 may determine a dangerous situation of the driver (the drowsy driving, negligence driving, or abnormal physical state of the driver) based on the outputs of the first to third sensor devices 112, 113, and 114. When it is determined that the driver is in a dangerous situation as a result of the determination by the driver state determining device 115, the driving assistance device 116 may control a turn signal to turn on an emergency lamp and try to maintain the vehicle in its lane. At the same time, the driving assistance device 116 may transmit the internal and external screens of the vehicle to the management server 200, decelerate the vehicle, and ignore the input of the accelerator pedal in cooperation with the telematics controller 150. When it is determined that the driver state is serious based on the transmitted internal and external screens of the vehicle, the management server 200 may wirelessly control the driving assistance device 116 to move the vehicle to the end lane while checking an image of surroundings of the vehicle and then stop the vehicle.

FIGS. 3A to 3D are diagrams for describing face recognition based risk determination in the driver state determining device of FIG. 2. An operation of determining a driver state based on face recognition based on a driver image transmitted from the first sensor device 112 will be described below with reference to FIGS. 3A to 3D.

Figure 3A:
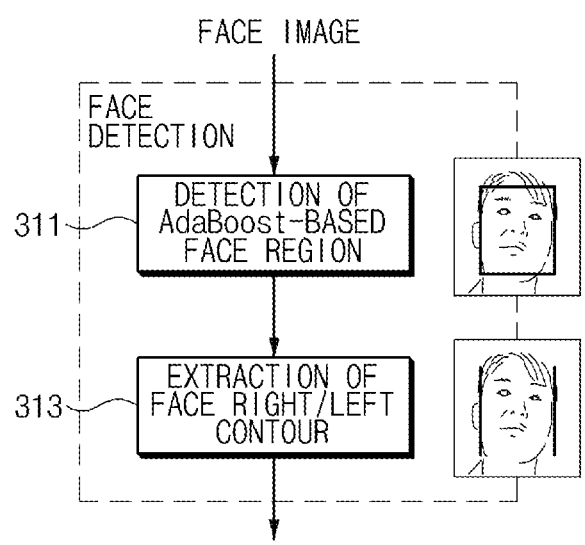
FIGS. 3A, 3B, 3C, and 3D are diagrams for describing face recognition based risk determination in the driver state determining device of FIG. 2.

The driver state determining device 115, receiving the driver image from the first sensor device 112, may detect a face of the driver from the driver image. For example, as shown in FIG. 3A, the driver state determining device 115 may detect a face region from the driver image based on an adaptive boosting algorithm (AdaBoost) (311), and extract left and right contour to detect the driver face from the driver image (313).

Figure 3B:
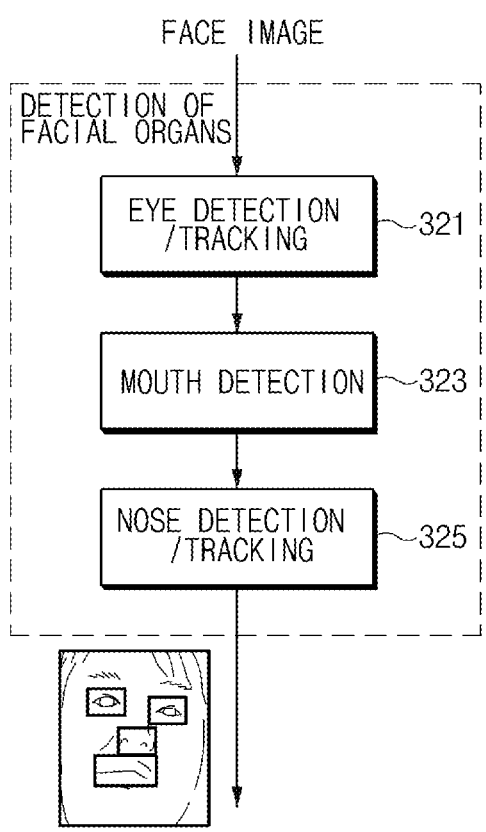

When the driver face is detected, the driver state determining device 115 may detect the driver's facial organ. For example, as shown in FIG. 3B, the driver state determining device 115 may detect and track the eyes in the driver's face region (321), detect the driver's mouth (323), and then detect and track the driver's nose (325). The driver state determining device 115 may detect facial organs in the order of eyes, mouth, and nose of the driver, but is not limited thereto.

When the facial organs (eyes, nose, mouth) of the driver's face region are detected, the driver state determining device 115 may determine a dangerous situation according to the driver's face direction and whether the driver's eyes are opened or closed based on the detected driver's facial organs.

Figure 3C:
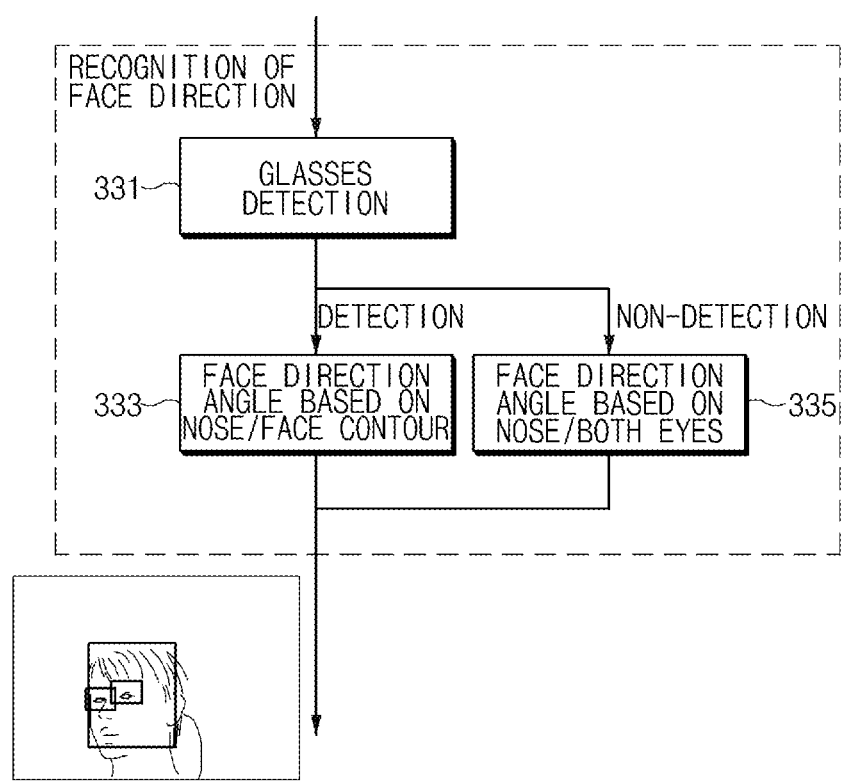

Referring to FIG. 3C, the driver state determining device 115 may calculate a face direction angle of the driver based on the detected driver's facial organs, and determine a dangerous situation when the driver is not looking forward based on the calculated face direction angle. In this case, the driver state determining device 115 may detect the glasses in the detected driver's facial region (331). When the glasses are detected (detection), the driver state determining device 115 may calculate a face direction angle based on the nose and the contour of the face in the driver's face region (333). In addition, when the glasses are not detected (non-detection), the driver state determining device 115 may calculate a face direction angle based on the nose and both eyes in the driver's face region (335). The driver state determining device 115 may determine whether the driver gazes forward based on the calculated face direction angle.

Figure 3D:
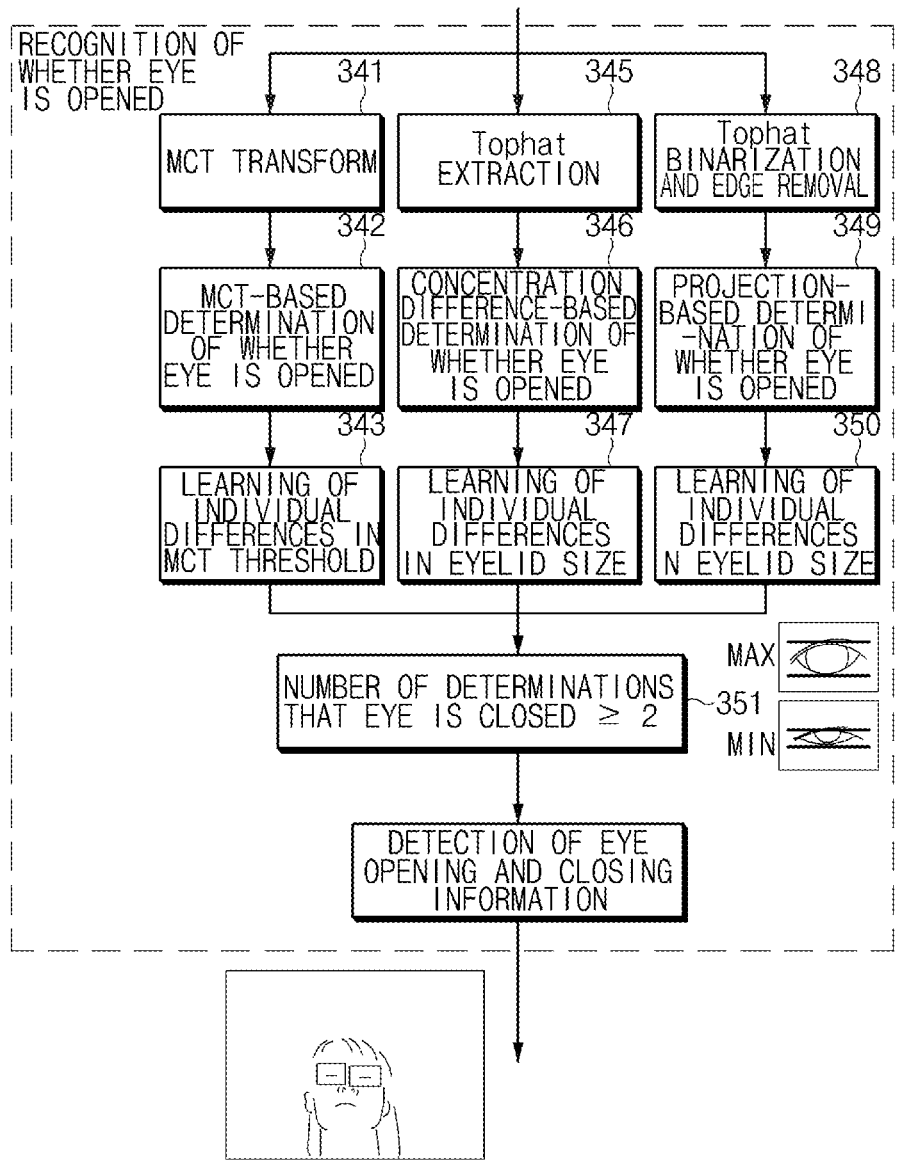

Referring to FIG. 3D, the driver state determining device 115 may detect eye opening and closing information based on the eyes among the detected driver's facial organs, and determine a dangerous situation according to the eye opening and closing information. For example, the driver state determining device 115 may determine whether the eyes are opened or closed by inputting an image of the eyes of the detected driver's facial organs into a plurality of algorithms and generate a result of the determination as the eye opening and closing information. In this case, the driver state determining device 115 may generate the same results of at least half of the determination results of the plurality of algorithms as the eye opening and closing information. FIG. 3D illustrates an embodiment in which the determination results of two or more algorithms among the three algorithms is generated as the eye opening and closing information, but is not limited thereto.

The driver state determining device 115 shown in FIG. 3D illustrates an embodiment of detecting eye opening and closing information through the first to third algorithms.

The first algorithm may be a Modified Census Transform (MCT)-based algorithm, and the second and third algorithms may be Tophat transform (Tophat)-based algorithms.

The first algorithm may perform MCT transform on an image of the eyes of the detected driver's facial organs (341) and determine whether the eye is opened or closed based on the MCT (342).

The second algorithm may extract the Tophat based on an image of the eye of the detected driver's facial organs (345) and determine whether the eye is opened or closed based on a difference in concentration (346).

The third algorithm may binarize the Tophat for the image of the eye of the detected driver's facial organs, remove an edge (348), and determine whether the eye is opened or closed during a projection period (349). In this case, because individuals are different in term of eye size, the first to third algorithms may accurately determine whether the eye is opened or closed through learning of individual differences. The first algorithm may more accurately determine whether the eye is opened or closed through learning of individual differences in MCT threshold (343) after the MCT based determination of whether the eye is opened or closed (342). The second algorithm may more accurately determine whether the eye is opened or closed by learning individual differences in eyelid size (347) after concentration difference-based determination of whether the eye is opened or closed (346). The third algorithm may more accurately determine whether the eye is opened or closed by learning individual differences in eyelid size (350) after projection-based determination of whether the eye is opened or closed (349).

The driver state determining device 115 may generate or detect eye opening and closing information indicating that the dangerous situation occurs when the determination results of the two or more algorithms among the determinations of the first to third algorithms represent that the eye is closed (351).

Figure 4C:
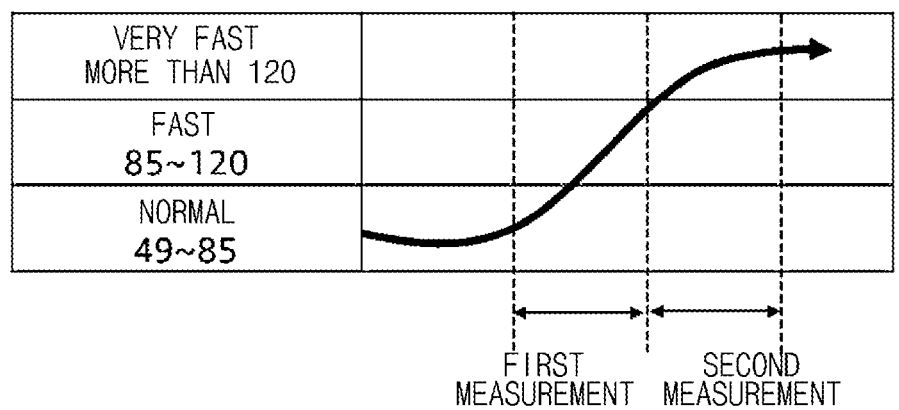

FIGS. 4A, 4B, and 4C are diagrams for describing determination of physical risk in the driver state determining device of FIG. 2. An operation of determining a driver's abnormal state based on the driver's biometric information transmitted from the third sensor device 114 will now be described with reference to FIGS. 4A, 4B 4C. In this case, the driver's biometric information transmitted from the third sensor device 114 may include a heart rate, a blood pressure, and a body temperature of the driver. FIGS. 4A and 4B illustrate heart rates according to ages of men and women, and the driver state determining device 115 may store a heart rate table as shown in FIGS. 4A and 4B.

As illustrated in FIG. 4C, the driver state determining device 115 may determine a dangerous state when the driver's heart rate measured and transmitted by the third sensor device 114 is kept above a normal range. For example, the driver state determining device 115 may determine a dangerous state when the driver's heart rate measured by the third sensor device 114 is measured to be a heart rate exceeding the normal range, a predetermined number of times. In this case, in FIG. 4C, two measurement results of the driver's heart rate has exceeded the normal range, and the driver state determining device 115 may determine a dangerous state because the two measurement results of the driver's heart rate have all exceeded the normal range. In addition, the driver state determining device 115 may determine a normal state when the driver's heart rate is in the normal range and communication between the driver and the management server is normally performed.

Although not shown in FIGS. 4A, 4B and 4C, the driver's blood pressure and the body temperature measured by the third sensor device 114 may be provided to the driver state determining device 115. The driver state determining device 115 may determine a dangerous state when the driver's blood pressure exceeds the normal range (70 to 120 mmHg). The driver state determining device 115 may determine a dangerous state when the driver's body temperature exceeds a normal range (35 to 39 degrees Celsius). On the other hand, the driver state determining device 115 may determine a dangerous state when a result of measurement of the driver's blood pressure or body temperature exceeds a normal range more than a preset number of times (for example, two times) as in the case of determining the dangerous state according to the heart rate, and may determine a normal state when a result of measurement of the driver's blood pressure or body temperature is the normal range and communication between the driver and the management server is normally performed.

Figure 5A:
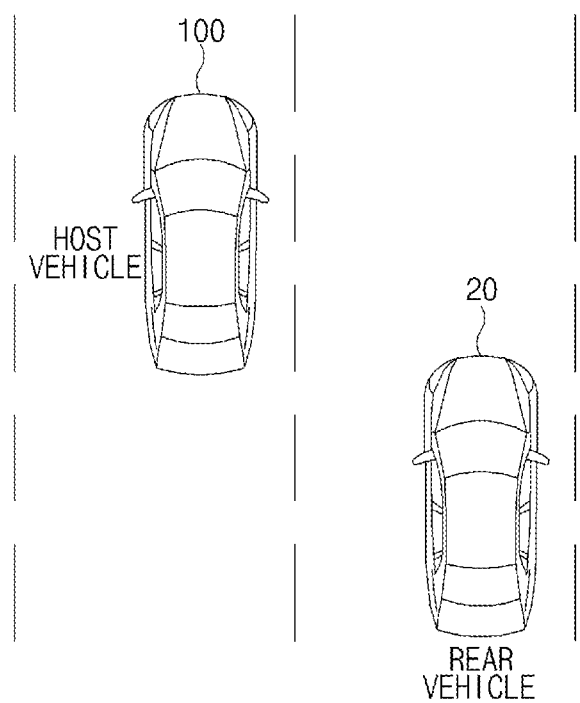
FIGS. 5A and 5B are diagrams for describing a wireless control lane changing function of a vehicle traveling control system according to an embodiment of the present disclosure.
Figure 5B:
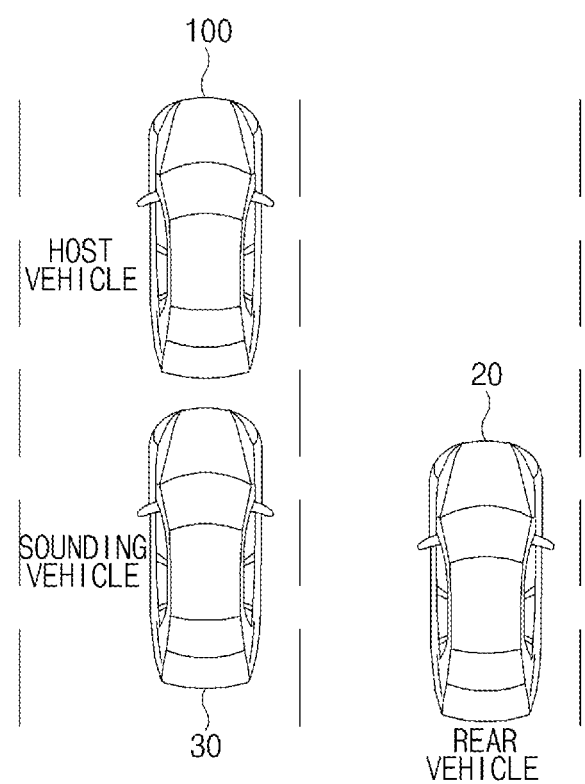

FIGS. 5A and 5B are diagrams for describing a wireless control lane changing function of a vehicle traveling control system according to an embodiment of the present disclosure. As described above, when the driver state determining device 115 has determined that a driver state is a dangerous state based on the measurement results of the first to third sensor devices 112, 113, and 114, lanes may be changed according to the wireless control of the management server 200. Referring to FIGS. 5A and 5B, the wireless control lane changing function of the vehicle traveling control system will be described below.

FIG. 5A illustrates a case in which, when the driver state determining device 115 has determined that the driver state is a dangerous state, the vehicle travels in a state of being on the right side in a current lane through wireless control of the management server 200 to induce deceleration of a rear vehicle 20.

When it is determined that the driver state of a host vehicle 100 is in a dangerous situation, the host vehicle 100 may operate flickering of a stop light of the host vehicle 100 according to the wireless control of the management server 200 to inform the rear vehicle 20 of a dangerous state. Thereafter, the host vehicle 100 may be wirelessly controlled by the management server 200 to travel adjacent to a right lane in a range not to step on the right lane. In a case where a driver of the rear vehicle 20 recognizes a dangerous situation of the host vehicle 100 and yields, when a preset lane change condition is satisfied, the management server 200 may allow the host vehicle 100 to move to the right. In this case, the management server 200 may prevent steering or acceleration control by driver intervention.

FIG. 5B illustrates a case in which, when the driver state determining device 115 has determined that the driver state is in a dangerous situation, the management server 200 may communicate with a surrounding vehicle 30 capable of performing wireless communication with the management server 200 among surrounding vehicles of the host vehicle 100 and allow the surrounding vehicle 30 to request deceleration from the rear vehicle 20 behind the host vehicle 100 having a problem through, for example, an emergency light or hand signaling. In addition, the management server 200 may request the surrounding vehicle 30 to perform the role of a preceding vehicle leading the host vehicle 100 in front of the host vehicle 100 when necessary in a specific environment such as construction.

In a case where the driver of the rear vehicle 20 recognizes a dangerous state of the host vehicle 100 through change condition is satisfied, the management server 200 may allow the host vehicle 100 to move to the right. In this case, the management server 200 may prevent steering or acceleration control by driver intervention.

As illustrated in FIGS. 5A and 5B, when the host vehicle 100 moves to the right end lane, the management server 200 may allow the host vehicle 100 to stop.

Figure 6:
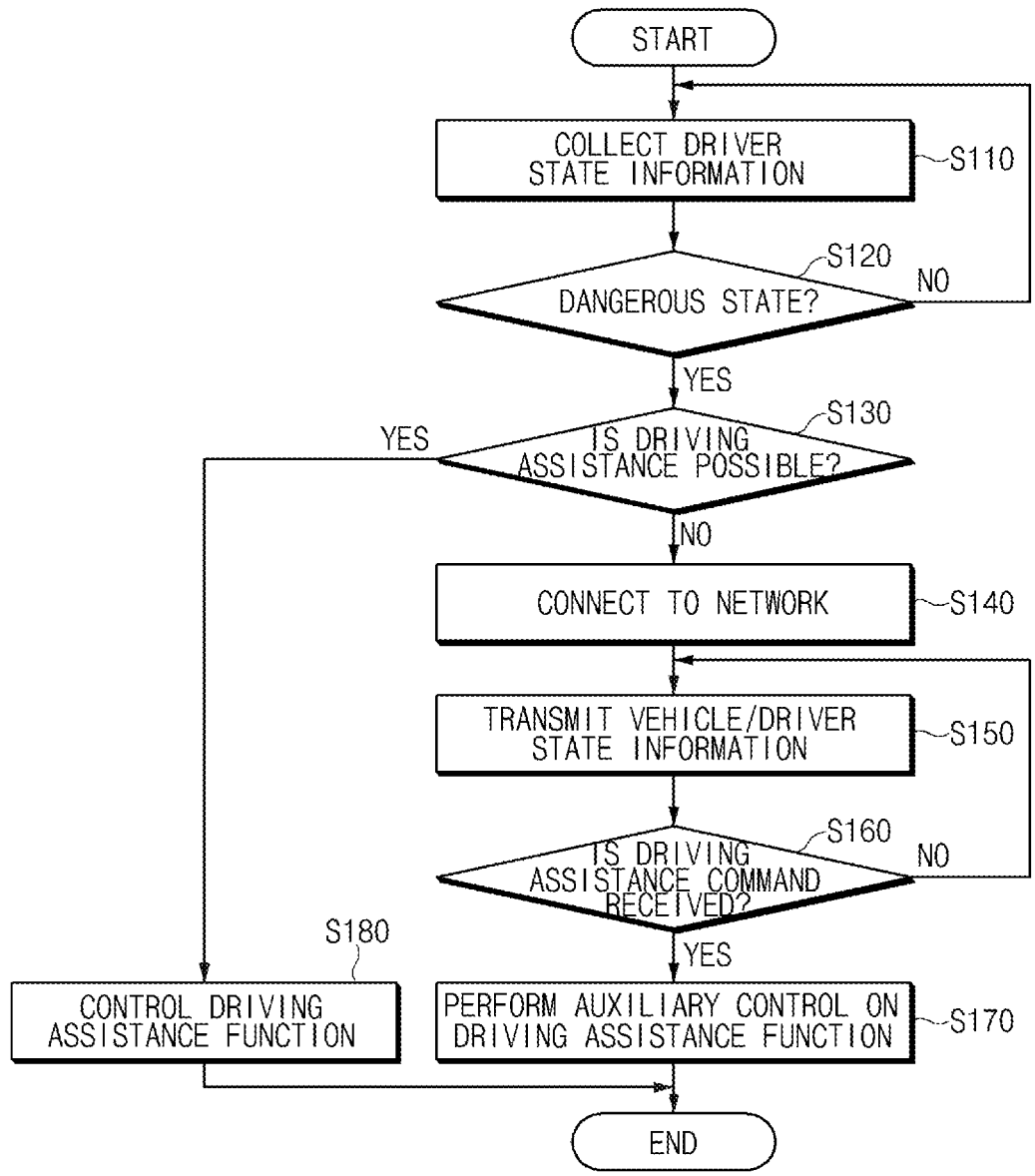
FIGS. 6 and 7 illustrate a flowchart of a vehicle traveling control method according to an embodiment of the present disclosure.
Figure 7:
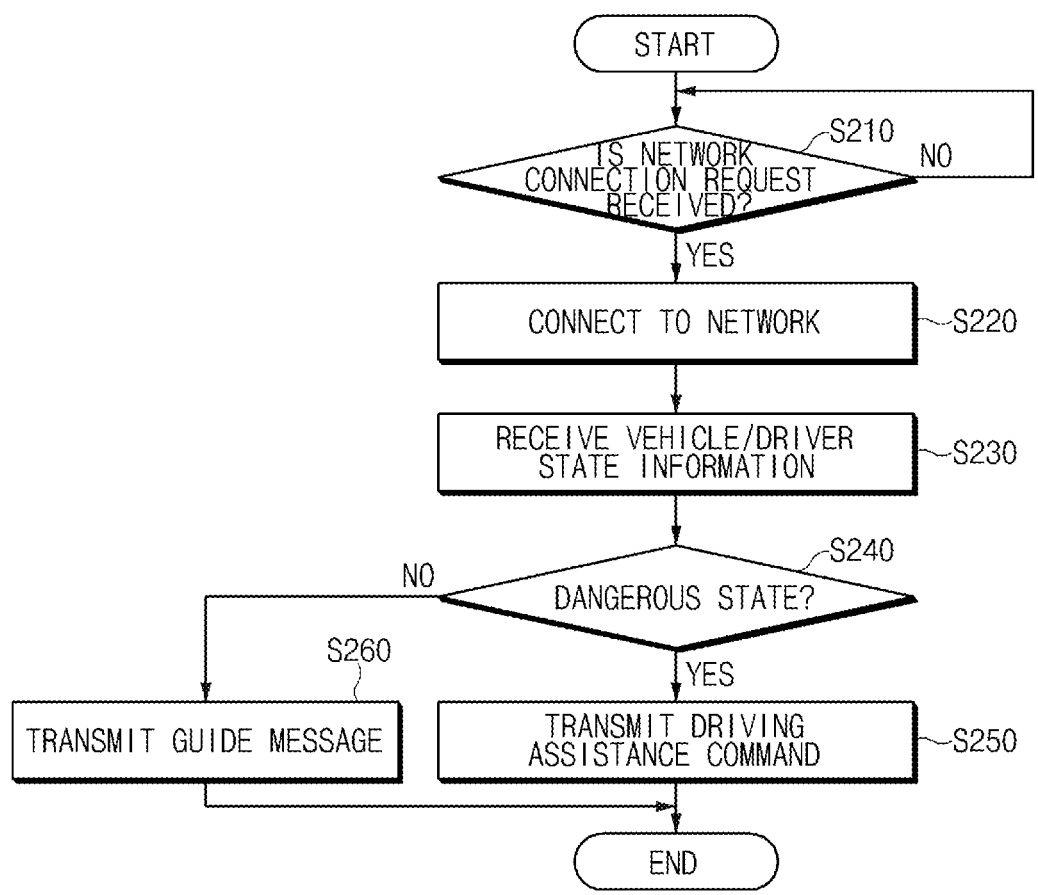

FIGS. 6 and 7 illustrate a flowchart of a vehicle traveling control method according to an embodiment of the present disclosure.

FIG. 6 illustrates a traveling control method for a vehicle according to an embodiment of the present disclosure, and relates to a traveling control method for a vehicle including the vehicle controller 110 and the telematics controller 150.

Referring to FIG. 6, the vehicle controller 110 may perform a step of collecting driver state information (S110), a step of determining a dangerous state (S120), a step of determining driving assistance (S130), and a step of controlling a driving assistance function (S180). In addition, the combination of the vehicle controller 110 and the telematics controller 150 may perform a step of connecting to a network (S140), a step of transmitting vehicle/driver state information (S150), a step of receiving a driving assistance command (S160) and a step of performing driving assistance function auxiliary control (S170).

The step of collecting the driver state information (S110) may include detecting, by the first to third sensor devices 112, 113, and 114, a driver image, movement of a vehicle, and biometric information of a driver (for example, heart rate, blood pressure, and body temperature).

The step of determining the dangerous state (S120) may be a step in which the driver state determining device 115 determines a dangerous situation based on the detection results of the first to third sensor devices 112, 113, and 114, which determines drowsy driving, negligence driving, and abnormal physical state of the driver. When a dangerous state is not determined (No) in the step of determining the dangerous state (S120), the step of collecting the driver state information (S110) may be performed. On the other hand, when a dangerous state is determined in the step of determining the dangerous state (S120), the step of determining driving assistance possibility (S130) may be performed.

The step of determining the driving assistance possibility (S130) may include determining, by the driver state determining device 115 and the driving assistance device 116, whether the management server 200 is involved in driving assistance. When it is determined that the driving assistance is not possible or the driving assistance is inappropriate (No) in the step of determining the driving assistance possibility (S130), the step of connecting to the network (S140) may be performed. On the other hand, when it is determined that the driving assistance is possible (Yes) in the step of determining the driving assistance possibility (S130), the step of controlling driving assistance function (S180) in the driving assistance device 116 may be performed. The case in which it is determined that the driving assistance is impossible may include hands-off detection, turn signal off by the driver, lane change operation delay, driver steering override, lane non-detection or lane mis-detection. The case in which it is determined that driving assistance is inappropriate may include dangerous area stop, long-time lane keeping, frequent lane change, lane keeping instability, lane detection instability, instability of recognition of a front vehicle, instability of a sensor such as a steering sensor.

The step of controlling the driving assistance function (S180) may include keeping the lane of the vehicle 100, moving the vehicle 100 to a surrounding resting place, or stopping the vehicle 100 at a shoulder or a resting place, without intervention of the management server 200.

The step of connecting to the network (S140) may include connecting wireless communication of the vehicle 100 and the management server 200 through the telematics controller 150.

The step of transmitting the vehicle/driver state information (S150) may include transmitting measurement results of the first to third sensor devices 112, 113, and 114 and a determination result of the driver state determining device 115 to the management server 200 using wireless communication.

The step of receiving the driving assistance command (S160) may include performing the step of performing auxiliary control for the driving assistance function (S170) when the driving assistance command is received from the management server 200 and performing the step of transmitting the vehicle/driver state information (S150) when the driving assistance command is not received from the management server 200.

The step of performing the driving assistance function auxiliary control (S170) may include moving or stopping the vehicle 100 through wireless control of the management server 200. For example, the step of performing the driving assistance function auxiliary control (S170) may include performing operation of turning on an emergency light, decelerating a vehicle speed, traveling adjacent to a lane, changing a lane, or stopping the vehicle through wireless control of the management server 200.

FIG. 7 relates to a traveling control method for a vehicle according to an embodiment of the present disclosure, and in particular a vehicle traveling control method of a management server that wirelessly controlling a vehicle including a vehicle controller and a telematics controller.

The operation of receiving a network connection request (S210) may include receiving, by the management server 200, a network connection request from the vehicle 100.

The network connection operation (S220) may include connecting wireless communication between the vehicle 100 and the management server 200 when the management server 200 that receives the network connection request accepts the network connection with the vehicle 100 (Yes).

The step of receiving the vehicle/driver state information (S230) may include receiving, by the management server 200, information on the vehicle/driver state from the vehicle 100 to which the network is connected. In this case, the information on the vehicle/driver state may include measurement results of the first to third sensor devices 112, 113, and 114 installed in the vehicle 100 and a determination result of the driver state determining device 115.

The step of determining the dangerous state (S240) may include a step of determining, by the management server 200, the dangerous state based on the vehicle/driver state information transmitted from the vehicle 100. In this case, a subject that determines the vehicle/driver state information transmitted from the vehicle 100 may be an employee of a center where the management server 200 is installed. When it is determined that the dangerous state is determined in the step of determining the dangerous state (S240), the step of transmitting of driving assistance command (S250) in which the driving assistance command is transmitted to the vehicle 100 may be performed. When it is determined that the dangerous state is not determined in step of determining the dangerous state (S240), the step of transmitting the guide message to the vehicle 100 (S260) may be performed.

Figure 8:
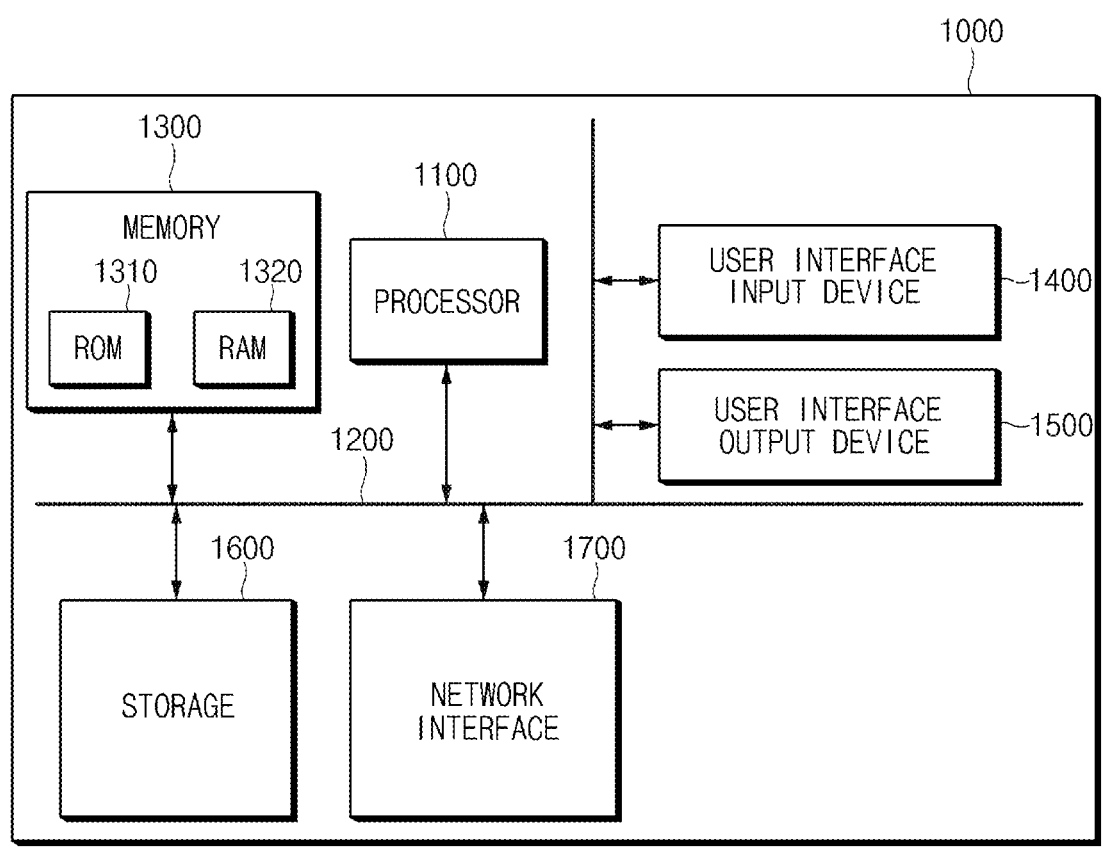
FIG. 8 illustrates a computing system in which a method according to an embodiment of the present disclosure is executed.

FIG. 8 illustrates a computing system in which a method according to an embodiment of the present disclosure is executed.

Referring to FIG. 8, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

According to embodiments of the present disclosure, it is possible to promote the safety of the driver and the vehicle by allowing the vehicle to move to the end lane through the wireless control of the management server when the driver drives a vehicle without looking ahead for a certain time (drowsy driving, negligence driving) and when an emergency situation occurs.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle traveling control device comprising:
a plurality of sensor devices configured to detect a driver image and determine a driver state;
a driver state determining device configured to receive detection results from the plurality of sensor devices and determine whether the driver state is a dangerous state; and
a driving assistance device configured to perform lane keeping control and speed control of a vehicle and transmit a network connection request to a management server when the driver state determining device has determined the dangerous state,
wherein the driver state determining device is configured to:
determine whether eyes are opened or closed from the driver image using at least two algorithms among a plurality of algorithms, including a first algorithm, a second algorithm and a third algorithm that are different from each other, wherein the first algorithm, the second algorithm and the third algorithm determine whether the eyes are opened or closed through learning of individual differences, and
wherein the driver state determining device is further configured to generate eye opening and closing information indicating that a dangerous situation occurs when each of two or more determination results, among determination results of the first to third algorithms, indicates that the eyes are closed.

2. The vehicle traveling control device of claim 1, wherein the driving assistance device prevents steering and acceleration control of the vehicle by a driver in the dangerous state.

3. The vehicle traveling control device of claim 2, wherein the driving assistance device transmits detection results of the plurality of sensor devices and a determination result of the driver state determining device to the management server when the management server is connected to a network.

4. The vehicle traveling control device of claim 3, wherein the driving assistance device moves and stops the vehicle through wireless control of the management server.

5. The vehicle traveling control device of claim 1, wherein the plurality of sensor devices further detect at least one or more of a traveling state of the vehicle or biometric information of the driver.

6. The vehicle traveling control device of claim 5, wherein the driver state determining device determines the dangerous state based on the at least one or more of the driver image, the traveling state of the vehicle, or the biometric information of the driver.

7. The vehicle traveling control device of claim 6, wherein the dangerous state is a state in which the driver drives the vehicle without looking ahead, and includes at least one or more of a drowsy driving, negligence driving, or an abnormal physical state of the driver.

8. The vehicle traveling control device of claim 6, wherein the driver state determining device detects a driver's face from the driver image and determines a driver's face direction and whether the eyes are opened or closed.

9. The vehicle traveling control device of claim 8, wherein the driver state determining device inputs a driver's face image detected from the driver image into the plurality of algorithms, and determines whether the eyes are opened or closed based on a determination result of at least half of the algorithms that have obtained the same result.

10. The vehicle traveling control device of claim 6, wherein the biometric information of the driver includes at least one or more of a heart rate, a blood pressure, or a body temperature of the driver.

11. The vehicle traveling control device of claim 10, wherein the driver state determining device determines the dangerous state when the at least one of the heart rate, the blood pressure, or the body temperature of the driver exceeds a normal range.

12. The vehicle traveling control device of claim 11, wherein the driver state determining device determines the dangerous state when the at least one of the heart rate, the blood pressure, or the body temperature of the driver which exceeds the normal range is detected predetermined number of times.

13. A vehicle traveling control system comprising:
a vehicle configured to transmit a network connection request when a driver state is a dangerous state; and
a management server configured to connect the vehicle to a network and wirelessly control traveling of the vehicle when the network connection request is received from the vehicle,
wherein the vehicle detects a driver image and determines whether eyes are opened or closed from the driver image using at least two algorithms among a plurality of algorithms, including a first algorithm, a second algorithm and a third algorithm that are different from each other, when determining the driver state, wherein the first algorithm, the second algorithm and the third algorithm determine whether the eyes are opened or closed through learning of individual differences, and
the vehicle generates eye opening and closing information indicating that a dangerous situation occurs when each of two or more determination results, among determination results of the first to third algorithms, indicates that the eyes are closed.

14. The vehicle traveling control system of claim 13, wherein the vehicle determines the dangerous state based on at least one or more of the driver image, a traveling state of the vehicle, or biometric information of a driver.

15. The vehicle traveling control system of claim 14, wherein the vehicle transmits the at least one or more of the driver image, the traveling state of the vehicle, or the biometric information of the driver to the management server when the dangerous state is determined.

16. The vehicle traveling control system of claim 15, wherein the management server determines whether to perform wireless control on the traveling of the vehicle based on the at least one or more of the driver image, the traveling state of the vehicle, or the biometric information of the driver transmitted from the vehicle.

17. A vehicle traveling control method comprising:
a driver state information collecting step of detecting at least one or more of a driver image, a traveling state of a vehicle, or biometric information of a driver;
a first dangerous state determining step of determining a dangerous state based on the at least one or more of the driver image, the traveling state of the vehicle, or the biometric information of the driver which are detected;
a vehicle and driver state information transmitting step of transmitting a detection result of the driver state information collecting step to a management server when the dangerous state is determined in the first dangerous state determining step;
a second dangerous state determining step of determining the dangerous state based on the detection result transmitted in the vehicle and driver state information transmitting step;
a driving assistance command transmitting step of transmitting a driving assistance command to the vehicle when the dangerous state is determined in the second dangerous state determining step; and
a driving assistance function auxiliary control step of controlling traveling of the vehicle according to wireless control of the management server when the driving assistance command is received, wherein the first dangerous state determining step comprising:
determining whether eyes are opened or closed from the driver image using at least two algorithms among a plurality of algorithms, including a first algorithm, a second algorithm and a third algorithm that are different from each other, wherein the first algorithm, the second algorithm and the third algorithm determine whether the eyes are opened or closed through learning of individual differences; and
generating eye opening and closing information indicating that a dangerous situation occurs when each of two or more determination results, among determination results of the first to third algorithms, indicates that the eyes are closed.

18. The vehicle traveling control method of claim 17, further comprising preventing acceleration and steering control of the vehicle by intervention of the driver when the dangerous state is determined in the first dangerous state determining step.

19. The vehicle traveling control method of claim 17, wherein the driving assistance function auxiliary control step includes:
flickering an emergency light of the vehicle,
decelerating a speed,
performing a lane change by traveling adjacent to a lane, and
when the vehicle reaches an end lane of a driving road, stopping the vehicle through control of the management server.

* * * * *